United States Patent [19]

du Quesne

[11] Patent Number: 4,750,538
[45] Date of Patent: Jun. 14, 1988

[54] MECHANISM FOR HOLDING A WHEEL IN A DEVICE FOR FITTING TIRES TO AND REMOVING TIRES FROM WHEEL RIMS

[76] Inventor: Francis du Quesne, Kleistraat 138, 2630 Aartselaar, Belgium

[21] Appl. No.: 946,155

[22] Filed: Dec. 23, 1986

Related U.S. Application Data

[63] Continuation of Ser. No. 746,257, Jun. 18, 1985, abandoned.

[30] Foreign Application Priority Data

Jun. 29, 1984 [BE] Belgium ................................ 2/60445

[51] Int. Cl.⁴ ............................................ B60C 25/08
[52] U.S. Cl. ...................................... 157/1.24; 157/16
[58] Field of Search ................. 157/1.22, 1.24, 1.46, 157/14, 16–18, 20–21; 269/153, 111

[56] References Cited

U.S. PATENT DOCUMENTS

| 3,493,030 | 2/1970 | Strang et al. | 157/1.24 |
| 3,528,475 | 4/1970 | Duquesne | 157/1.24 |
| 3,791,434 | 2/1974 | Duquesne | 157/1.24 |
| 4,093,006 | 6/1978 | Hessels | 157/18 |

FOREIGN PATENT DOCUMENTS 304047 1/1929 United Kingdom ............... 157/1.24

Primary Examiner—Debra Meislin
Attorney, Agent, or Firm—Berman, Aisenberg & Platt

[57] ABSTRACT

The mechanism comprises a rotatable central shaft with pinion, racks engaging said pinion at two different levels and a change on the outside end of each rock for gripping the wheel, which clamps lie in the same plane.

5 Claims, 3 Drawing Sheets

MECHANISM FOR HOLDING A WHEEL IN A DEVICE FOR FITTING TIRES TO AND REMOVING TIRES FROM WHEEL RIMS

RELATED APPLICATION

This application is a continuation of Ser. No. 746,257, filed June 18, 1985 now abandoned.

The invention is for a mechanism for holding a wheel in a device for fitting tires to and removing them from wheel rims, which mechanism consists of a table which turns about a shaft and on which the wheel is fixed by means of clamps which can be moved towards the wheel. These clamps are mounted on various racks, which engage a pinion affixed to the said shaft and of which the rotation can be controlled. Above the table, an arm with the tools for the fitting and removal of tires to and from the wheel is conventionally set up.

A similar mechanism is known, in which use is made of three or four racks located in the same plane, the linear and tangential displacement of which is controlled by a rotating pinion, the outer end of each rack being fitted with a clamp for gripping the wheel.

A major disadvantage of this mechanism is that as the racks are all located on the same level, the course of each one of them is limited, which consequently limits the diameter of the wheels which can be held. Another disadvantage is the tangential displacement of the racks and consequently the oblique motion of the clamps with respect to the wheel, which results in the imperfect location of the wheel in the curvature of the clamps and possible damage to the wheel.

The mechanism according to the invention aims at eliminating these drawbacks. To this end this mechanism consists primarily of those elements and arrangements described.

By virtue of this mechanism a very large difference between the smallest and the largest wheel is possible and rapid and effective radial displacement of the clamps towards the centre of the table rotation shaft is obtained, which in turn allows the wheel being fixed in position to be properly located in the curve of the clamp, so that improved centering and holding of the wheel on the table is achieved without the risk of damaging the wheel. Moreover, as a result of this relatively simple and cheap construction, no dirt can get on the control elements of the mechanism.

By way of example and without imposing any limitative character whatsoever, a detailed description is given below of a preferred embodiment of the mechanism in accordance with the invention.

This description refers to the attached drawings, in which.

Figure 1:
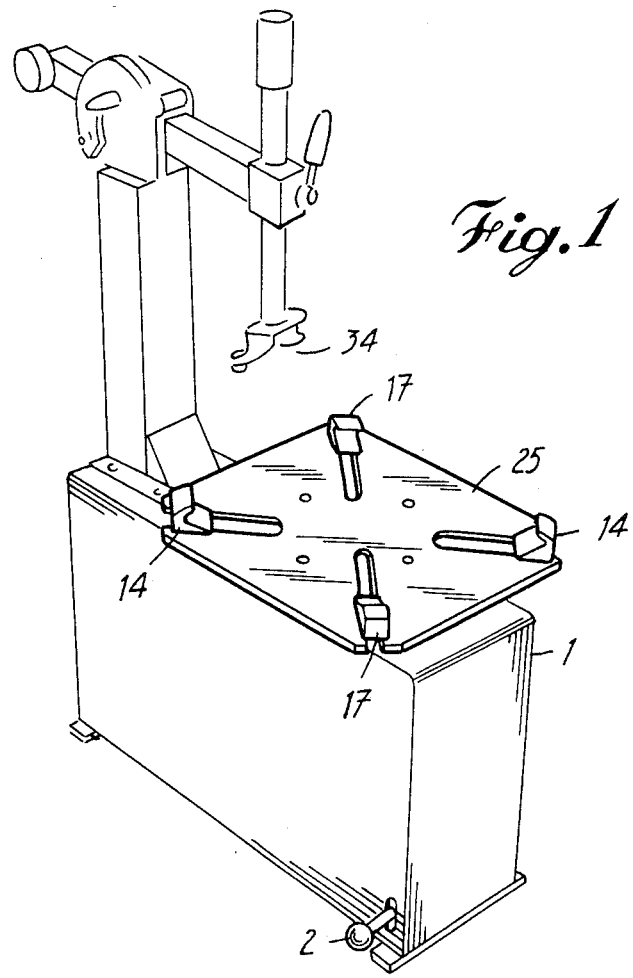
FIG. 1 is a perspective drawing of a device for fitting and removing tires, provided with a mechanism according to the invention.
Figure 2:
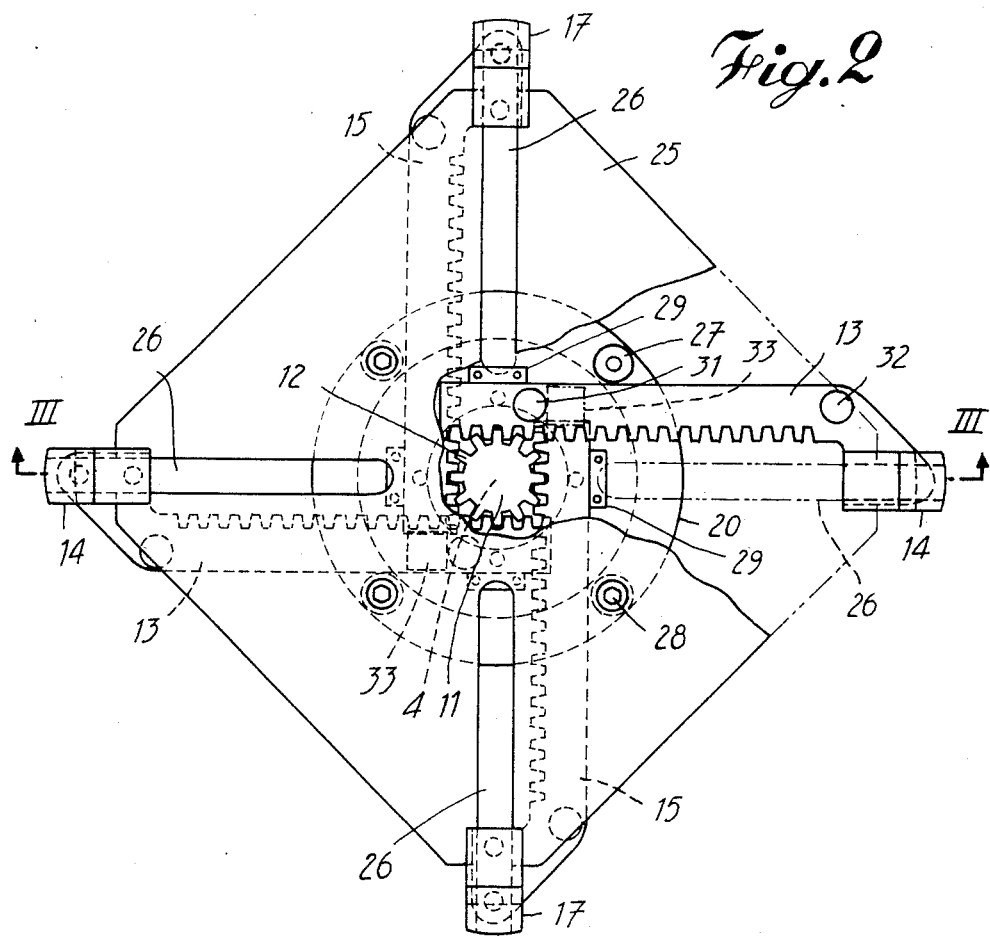
FIG. 2 is a partially cutaway plan view of the mechanism in accordance with invention.
Figure 3:
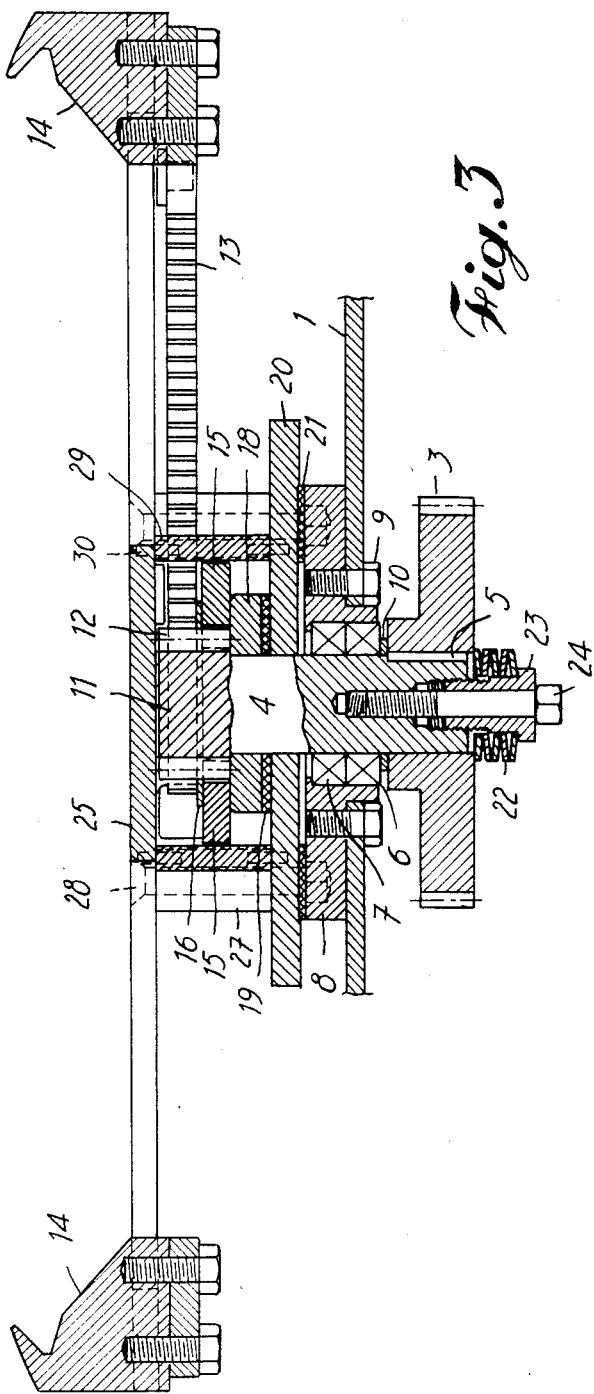
FIG. 3 represents, on a larger scale, a longitudinal section along line III—III of FIG. 2.

This device comprises a housing 1 in which a reduction motor (not shown) is installed capable of turning in both directions, the direction of which depends on the position of pedal 2. The reduction moter drives a toothed wheel 3 which is fitted to a shaft 4 by a key 5. The shaft 4 can slide along its axis in the ball bearings 6-7 mounted in a collar 8 fastened to the housing 1 by means of bolts 9. A washer 10 is provided between the toothed wheel 3 and the ball bearing 6. The upper end 11 of the shaft 4 is a pinion 12. The upper level of the pinion 12 engages in two parallel and diametrically opposed racks 13, each far end of which is curved and provided with a clamp 14, in such a way that the axis of displacement of each clamp is parallel to its respective rack and passes through the centre of pinion 12. The two clamps 14 thus move one towards the other maintaining the same radius during the parallel displacement of the racks 13. The lower level of the pinion 12 also engages in two racks 15 located in the same way as the racks 13 with respect to the pinion 12. The level of the racks 15 is kept separate from the level of the racks 13 by ring 16. The racks 15 are provided with clamps 17 and the axis of displacement of these is perpendicular to that of clamps 14.

In order to bridge the difference in level between the racks 13 and the racks 15, the latter are provided with spacers (not shown), so that the four clamps 14, 17 lie in the same plane. The two lower racks 15 move on a bearing disc 18 which forms part of the shaft 4. This bearing disc 18 bears through the intermediary of a friction disc 19 on a sliding disc 20 fitted around the shaft 4, which slipping disc is supported by collar 8 through the intermediary of a second friction disc 21. The desired pressure can be obtained between the bearing disc 18, the friction disc 19, the sliding disc 20, the friction disc 21, the collar 8 and the toothed wheel 3, by compressing the screw washers 22, located around a pressure bolt 23 screwed into shaft 4. In order to lock this bolt 23 into a given position, a locking screw 24 is provided which also screws into shaft 4 and which fits into a hole and passes through pressure bolt 23. The whole is surmounted by a square table with sawn-off corners 25 which is provided with four diagonal slots 26 in which the clamps 14, 17 slide radially. The said table 25 is supported by four posts 27 and fixed to the sliding disc 20 by means of the bolts 28, which are countersunk into the table. The locking of the friction discs 19, 21 and the discs 18, 20 by the intermediary of the pressure bolt 23 and screw washers 22 is necessary in order to immobilize the table 25 when the shaft 4 is rotated, and which is necessary until the clamps 14, 17 hold the wheel, after which the table and wheel assembly is put into rotation. Guides 29 are also provided between table 25 and the sliding disc 20 to guide each of the racks 13, 15 when they are moved. These guides 29 are fixed by means of dowels 30 to the table 25 and to the sliding disc 20. In order to limit the travel of the racks 13, 15 in both directions, the racks 13 are each provided with two dogs 31, 32 which act in conjunction with a stop 33 fixed under the table 25.

In order to fix a wheel in position, it is laid on the table 25 within the clamps 14, 17 and the electric reduction moter (not shown) is put into operation by means of the pedal 2. The toothed wheel 3 thus induces the rotation of the shaft 4 and the pinion 12. The latter moves the racks 13, 15 along a straight and tangential line, which results in the radial displacement of the four clamps 14, 17 in the direction of the wheel rim until they lock firmly against it. When the four clamps 14, 17 are locked in this way, the racks 13, 15 can no longer move, and it is the entire assembly with the wheel, now one with the shaft 4, which starts to rotate. In this way the tire to be fitted or removed is drawn along its tire flap under or over the tire-fitting tool 34, until the tire is fitted or removed from the wheel.

When the wheel is released, the reduction motor is put into reverse by pushing the pedal 2 in the opposite direction, so that the racks 13, 15 and the clamps 14, 17 move towards the outside and free the wheel.

It will be clear that the shape, the dimensions and the relative position of the aforementioned pieces can differ and be replaced by others with the same functions, on condition that they do not go beyond the scope of this invention.

I claim:

1. Mechanism for holding a wheel in a device and for fitting a tire on or removing it from a wheel rim, which mechanism comprises in combination:
   a chassis,
   a driven vertical shaft rotatably mounted on said chassis,
   a pinion fixedly mounted on said shaft,
   two pairs of racks perpendicular to each other, one pair of racks engaging said pinion at one level, and the other pair of racks engaging the pinion at a different level, each rack of each pair being parallel to the other rack of said pair, and diametrically opposed to the other rack of said pair with respect to said pinion,
   each of said racks having an outside end to which a clamp is fixed for cooperatively gripping the wheel, each clamp being diametrically opposed to another of said clamps and the four clamps lying in a common plane,
   a flat table disposed above said racks, said table having four radial slots for guiding the clamps of said racks, each slot being perpendicular to each adjacent slot,
   a sliding disc mounted freely around said shaft of the pinion below said racks,
   supporting means provided between said table and said sliding disc for supporting said table and securing said table to said sliding disc,
   a guide for each rack secured between said table and said sliding disc,
   a bearing disc and a friction disc around the shaft and between the lower racks and the sliding disc, and
   a common driving device, drivingly engaged with both the shaft and the table, for driving said shaft and for rotating said table, effecting radial displacement of said clamps fixed on the racks and rotation of said table with the clamps and fixed wheel.

2. Mechanism as defined in claim 1 wherein each rack has a curved outside end.

3. Mechanism as defined in claim 1 which comprises a housing, a collar mounted on the housing and a friction disc which is between said sliding disc and the collar.

4. Mechanism for holding a wheel in a device and for fitting a tire on or removing it from a wheel rim, which mechanism comprises in combination:
   a chassis,
   a driven vertical shaft rotatably mounted on said chassis,
   a pinion fixedly mounted on said shaft,
   two pairs of racks perpendicular to each other, one pair of racks engaging said pinion at one level, and the other pair of racks engaging the pinion at a different level, each rack of each pair being parallel to the other rack of said pair, and diametrically opposed to the other rack of said pair with respect to said pinion,
   each of said racks having an outside end to which a clamp is fixed for cooperatively gripping the wheel, each clamp being diametrically opposed to another of said clamps and the four clamps lying in a common plane,
   a flat table disposed above said racks, said table having four radial slots for guiding the clamps of said racks, each slot being perpendicular to each adjacent slot,
   a sliding disc mounted freely around said shaft of the pinion below said racks,
   supporting means provided between said table and said sliding disc for supporting said table and securing said table to said sliding disc,
   a guide for each rack secured between said table and said sliding disc,
   a bearing disc surrounding the shaft, said disc bearing on a first friction disc around the shaft and on said sliding disc, said bearing disc being disposed between the lower pair of racks and the sliding disc, a collar mounted on the chassis, and a second friction disc mounted on the shaft between said sliding disc and the collar, amd
   a common driving device, drivingly engaged with both the shaft and the table, for driving said shaft and for rotating said table, effecting radial displacement of said clamps fixed on the racks and rotation of said table with the clamps and fixed wheel.

5. Mechanism as defined in claim 4 and in which the two friction discs are composed of plastic material.

* * * * *